United States Patent
Chou

(10) Patent No.: US 10,894,271 B2
(45) Date of Patent: Jan. 19, 2021

(54) SEALANT DISPENSER

(71) Applicant: UNIK WORLD INDUSTRIAL CO., LTD., Tainan (TW)

(72) Inventor: Wen-San Chou, Tainan (TW)

(73) Assignee: UNIK WORLD INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 16/578,978

(22) Filed: Sep. 23, 2019

(65) Prior Publication Data

US 2020/0101487 A1 Apr. 2, 2020

(30) Foreign Application Priority Data

Sep. 28, 2018 (TW) .............................. 107213298 U

(51) Int. Cl.
*B05C 17/005* (2006.01)
*B29C 73/02* (2006.01)
*B29L 30/00* (2006.01)

(52) U.S. Cl.
CPC ...... *B05C 17/00573* (2013.01); *B29C 73/025* (2013.01); *B29L 2030/00* (2013.01)

(58) Field of Classification Search
CPC ............ B05C 17/00573; B29C 73/025; B29C 73/166; B29L 2030/00; B65D 23/001
See application file for complete search history.

(56) References Cited

U.S. PATENT DOCUMENTS

| 583,465 | A | * | 6/1897 | Friedeberg | ........... B67D 1/0412 222/399 |
|---|---|---|---|---|---|
| 595,323 | A | * | 12/1897 | Lychenheinn | ....... B65D 83/663 222/396 |
| 2010/0005930 | A1 | * | 1/2010 | Lolli | ..................... B29C 73/166 81/15.5 |
| 2011/0192492 | A1 | * | 8/2011 | Kanenari | .............. B29C 73/166 141/38 |
| 2015/0014273 | A1 | * | 1/2015 | Otero | ..................... B65D 23/02 215/316 |
| 2020/0101487 | A1 | * | 4/2020 | Chou | .................... B29C 73/166 |

* cited by examiner

*Primary Examiner* — David P Angwin
*Assistant Examiner* — Bob Zadeh

(57) ABSTRACT

A sealant dispenser comprising: a hollow can which includes an accommodation chamber, an opening, a connection seat, chemical sealant, an insertion, and the two peripheral ribs formed on a bottom of the insertion. A sealant dispenser is fixed on an accommodation box in which an air compressor is accommodated, the accommodation box includes a fixing hole, a U-shaped protrusion formed on a lower end of the fixing hole, a positioning space defined on the fixing hole above the U-shaped protrusion, and a peripheral column surrounding around the fixing hole, the U-shaped protrusion and the positioning space. The insertion of the hollow can is inserted into the fixing hole of the accommodation box, and the sealant dispenser is rotated so that the two peripheral ribs of the insertion are retained with the positioning space of the fixing hole, thus fixing the sealant dispenser on the accommodation box.

8 Claims, 16 Drawing Sheets

US 10,894,271 B2

SEALANT DISPENSER

FIELD OF THE INVENTION

The present invention relates to a sealant dispenser which is fixed on an accommodation box of an air compressor securely.

BACKGROUND OF THE INVENTION

Referring to FIG. 16, a conventional sealant dispenser 9 contains a cap 91, a hollow can 92, and a hollow tube 93 in which chemical sealant 94 is accommodated. The cap 91 has two branching parts, wherein a branching part is configured to receive high-pressure gas, and the other branching part is configured to supply the chemical sealant. The hollow tube 93 is connected with a first tube 95 of the cap 91. When the cap 91 is coupled with the hollow can 92, the hollow tube 93 is accommodated in the hollow can 92, the high pressure gas flows to force the chemical sealant 94 from the air compressor via an inflow pipe 96 so that the chemical sealant 94 is fed into a nozzle of a broken tire (not shown) via the hollow tube 93, a connection tube 95, a sealant supply tube 97, and a sealant hose. However, the hollow tube 93 movably removes from the connection tube 95 to drop on a bottom of the hollow can 92, when the high pressure gas is fed to force the chemical sealant 94, and a gap 98 occurs between the hollow tube 93 and the connection tube 95, so the high-pressure gas leaks from the gap 98 and cannot force the chemical sealant 94. In addition, the sealant dispenser overturns easily when feeding sealant into the tire.

The present invention has arisen to mitigate and/or obviate the afore-described disadvantages.

SUMMARY OF THE INVENTION

The primary aspect of the present invention is to provide a sealant dispenser which is fixed on the accommodation box in which the air compressor is accommodated, wherein the accommodation box includes a fixing hole, the U-shaped protrusion formed on the lower end of the fixing hole, the positioning space defined on the fixing hole above the U-shaped protrusion, and the peripheral column surrounding around the fixing hole, wherein the hollow can includes the connection seat and the insertion extending from the connection seat and inserted into the fixing hole of the accommodation box, and the sealant dispenser is rotated so that the two peripheral ribs of the bottom of the insertion are retained with the positioning space of the fixing hole, thus fixing the sealant dispenser on the accommodation box securely.

Further aspect of the present invention is to provide a sealant dispenser which contains a drive element rotating along the cap to force the punch element downward to pierces the film, and an air conduit of the cap is in communication with a feeding conduit of the cap so that a high-pressure gas is fed into the hollow can from the air compressor via the air conduit, and the chemical fluid is forced by the high-pressure gas and to flow out of the feeding conduit.

Another aspect of the present invention is to provide a sealant dispenser in which a drive element rotates along the cap to force the punch element downward to pierces the film, and an air conduit of the cap is in communication with a feeding conduit of the cap so that high-pressure gas is fed into the hollow can from the air compressor via the air conduit, and the chemical fluid is forced by the high-pressure gas and to flow out of the feeding conduit.

DETAILED DESCRIPTION OF THE PREFERRED EMBODIMENTS

Figure 1:
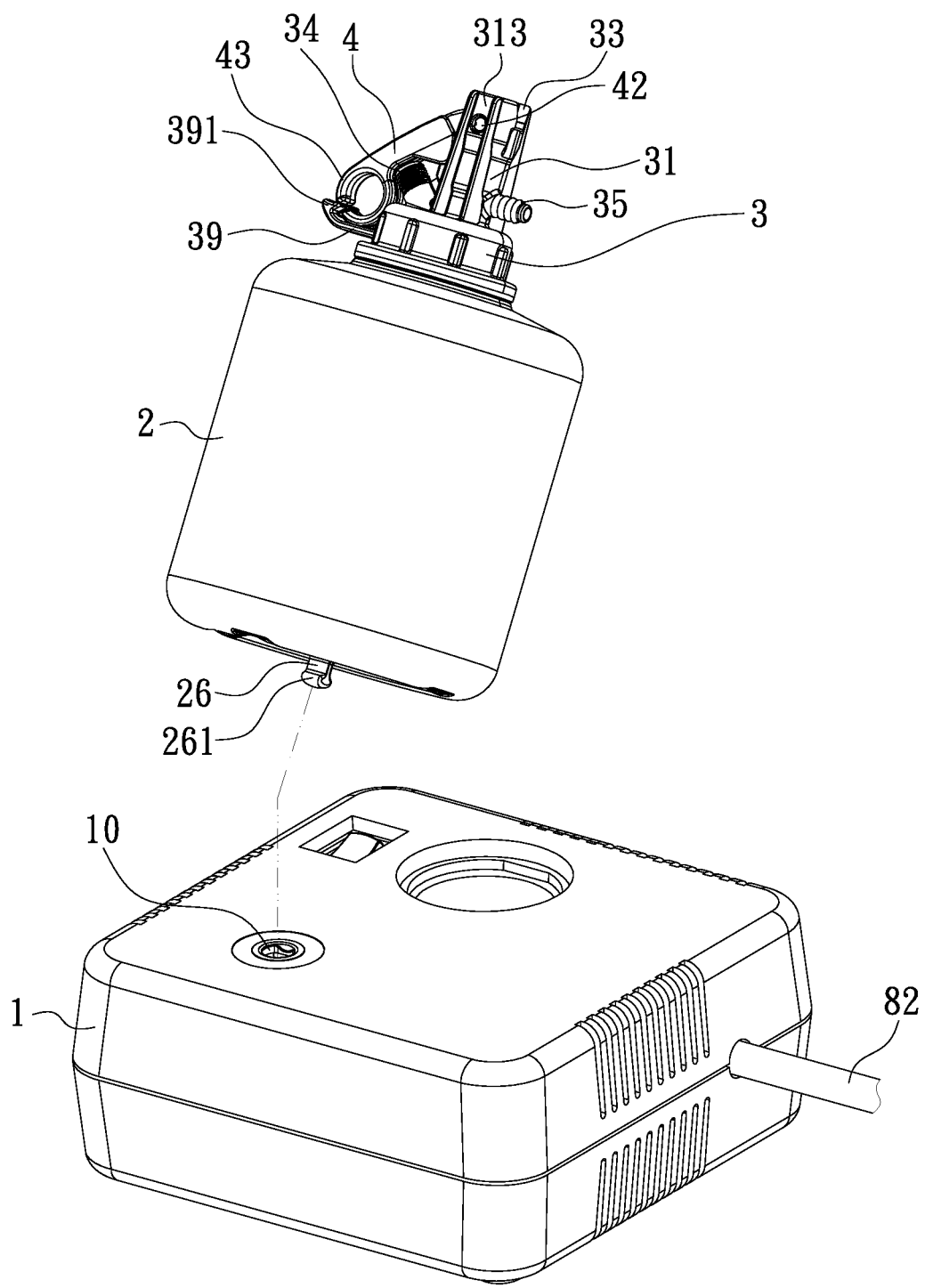
FIG. 1 is a perspective view showing the application of a sealant dispenser according to a preferred embodiment of the present invention.

With reference to FIGS. 1-4, a sealant dispenser according to a preferred embodiment of the present invention is fixed on an accommodation box 1 in which an air compressor 14 is accommodated, the accommodation box 1 includes a fixing hole 10, a U-shaped protrusion 11 formed on a lower end of the fixing hole 10, a positioning space 12 defined on the fixing hole 10 above the U-shaped protrusion 11, and a peripheral column 13 surrounding around the fixing hole 10, the U-shaped protrusion 11 and the positioning space 12. The sealant dispenser comprises a connection seat 24 and an insertion 26 extending from the connection seat 24 and inserted into the fixing hole 10 of the accommodation box 1, and the sealant dispenser is rotated so that two peripheral ribs 261 formed on a bottom of the insertion 26 are retained with the positioning space 12 of the fixing hole 10, thus fixing the sealant dispenser on the accommodation box 1.

Figure 5:
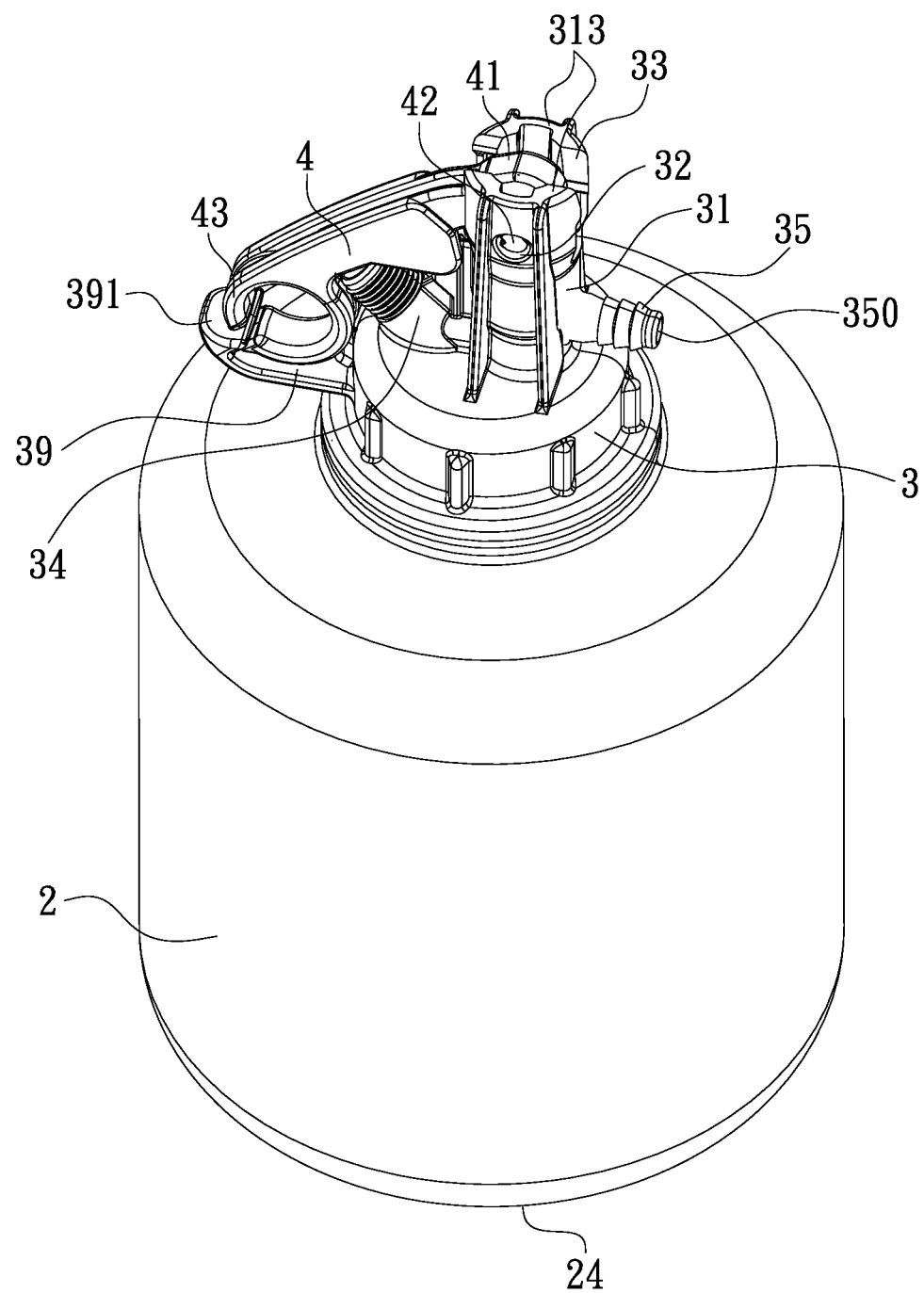
FIG. 5 is a perspective view showing the operation of the sealant dispenser according to the preferred embodiment of the present invention.
Figure 6:
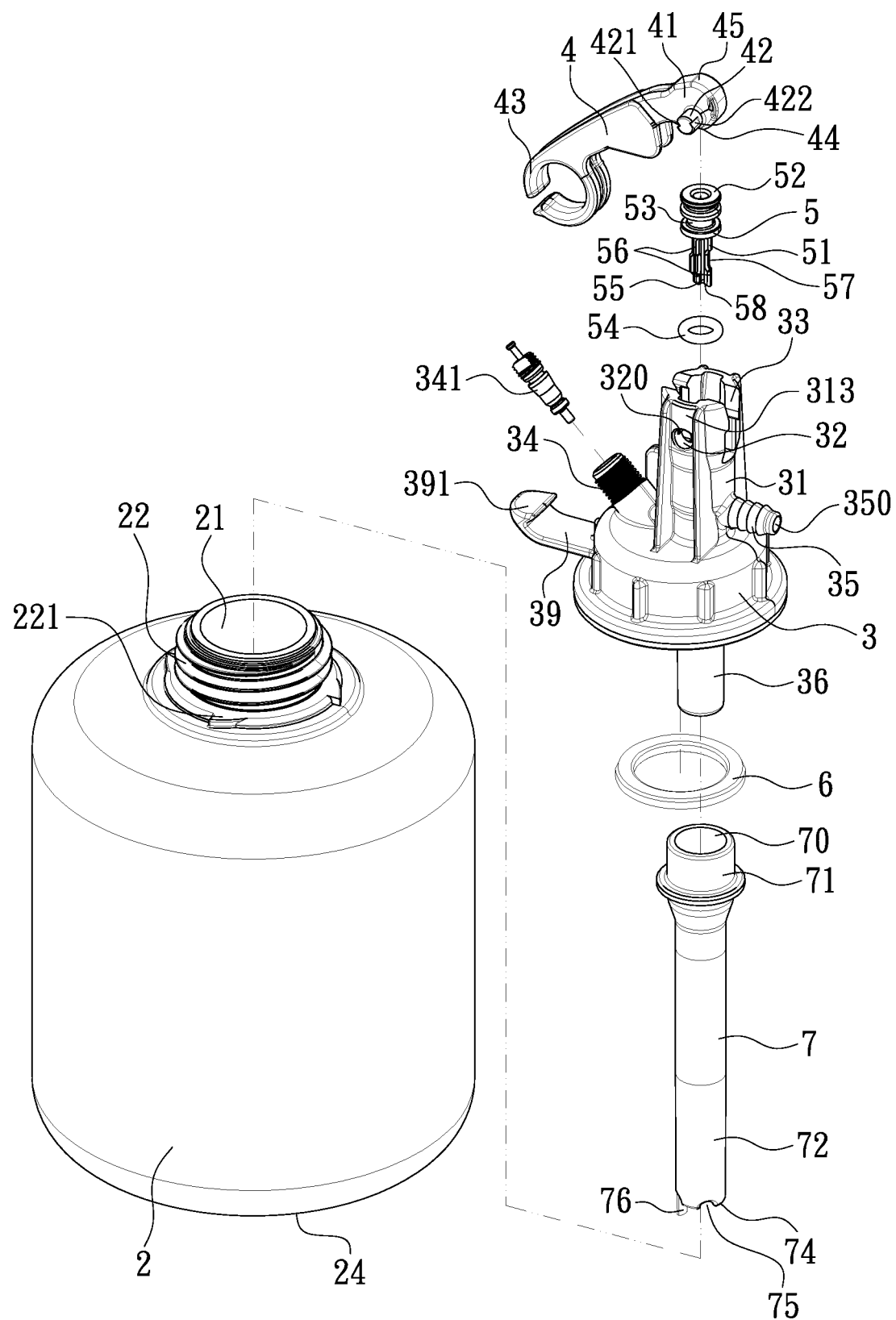
FIG. 6 is a perspective view showing the exploded components of the sealant dispenser according to the preferred embodiment of the present invention.
Figure 9:
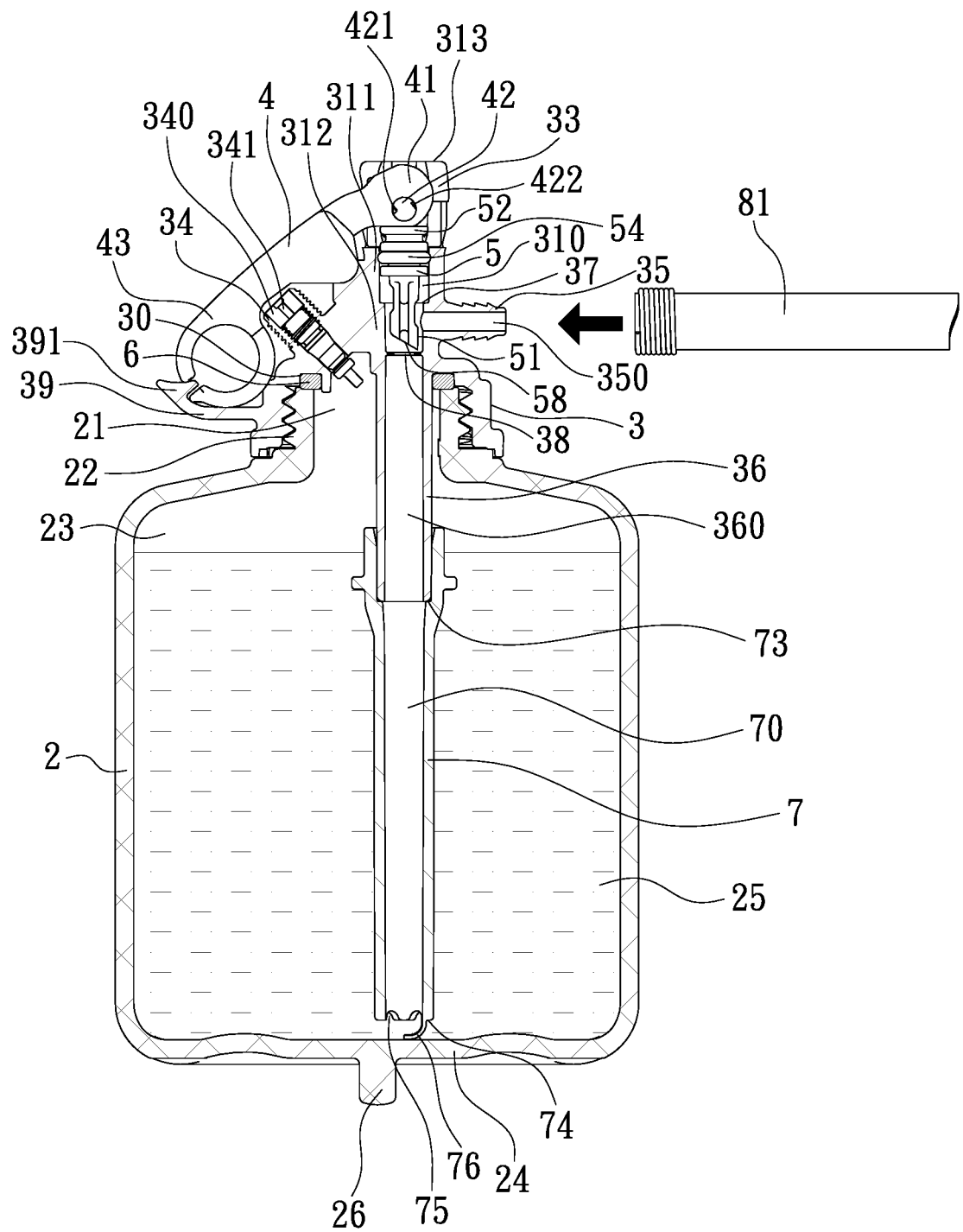
FIG. 9 is a cross sectional view showing the operation of the sealant dispenser according to the preferred embodiment of the present invention.
Figure 12:
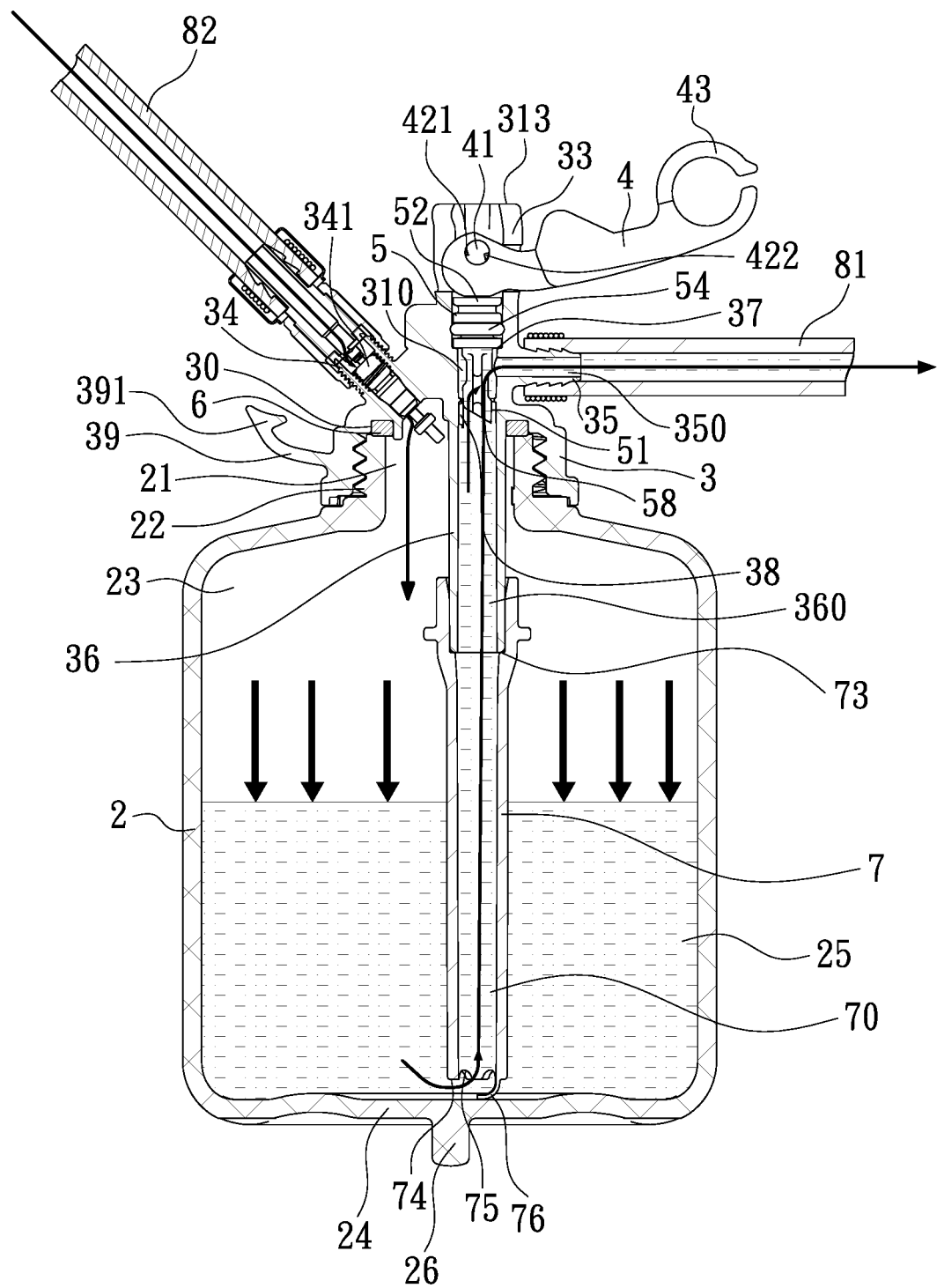
FIG. 12 is still another cross sectional view showing the operation of the sealant dispenser according to the preferred embodiment of the present invention.

Referring to FIGS. 5, 6, and 9, the sealant dispenser comprises: a hollow can 2 and a cap 3, the hollow can 2 includes an accommodation chamber 23 defined therein, an opening 21 defined on a first end of the hollow can 2, the connection seat 24 arranged on a second end of the hollow can 2, male threads 22 formed around the opening 21 of the hollow can 2, multiple ratchets 221 defined between the opening 21 and the hollow can 2, chemical sealant 25 accommodated in the accommodation chamber 23, the insertion 26 extending from the connection seat 24, and the two peripheral ribs 261 formed on the bottom of the insertion 26, as shown in FIG. 12.

Figure 7:
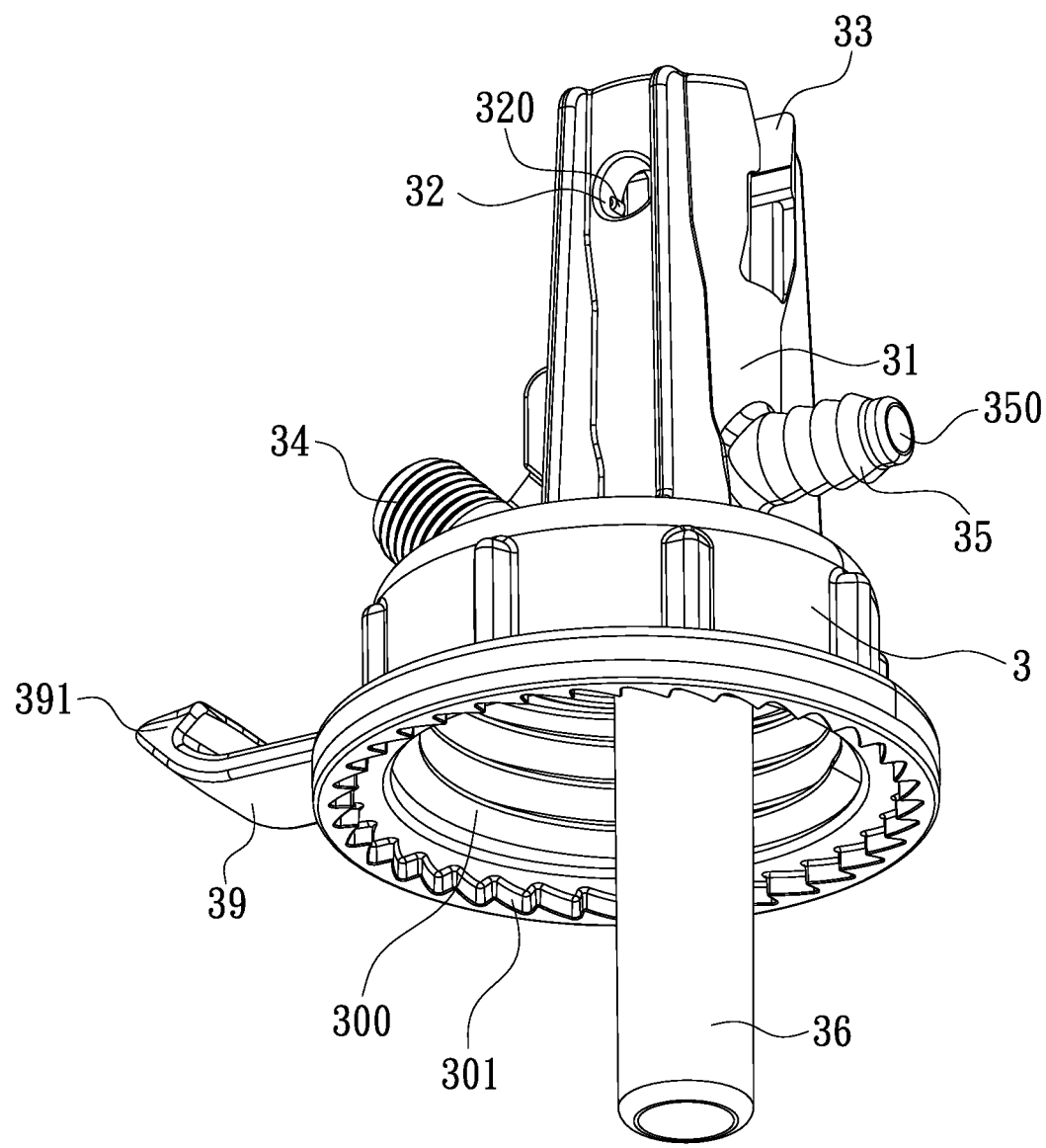
FIG. 7 is a perspective view showing the assembly of a part of the sealant dispenser pressure gauge according to the preferred embodiment of the present invention.
Figure 8:
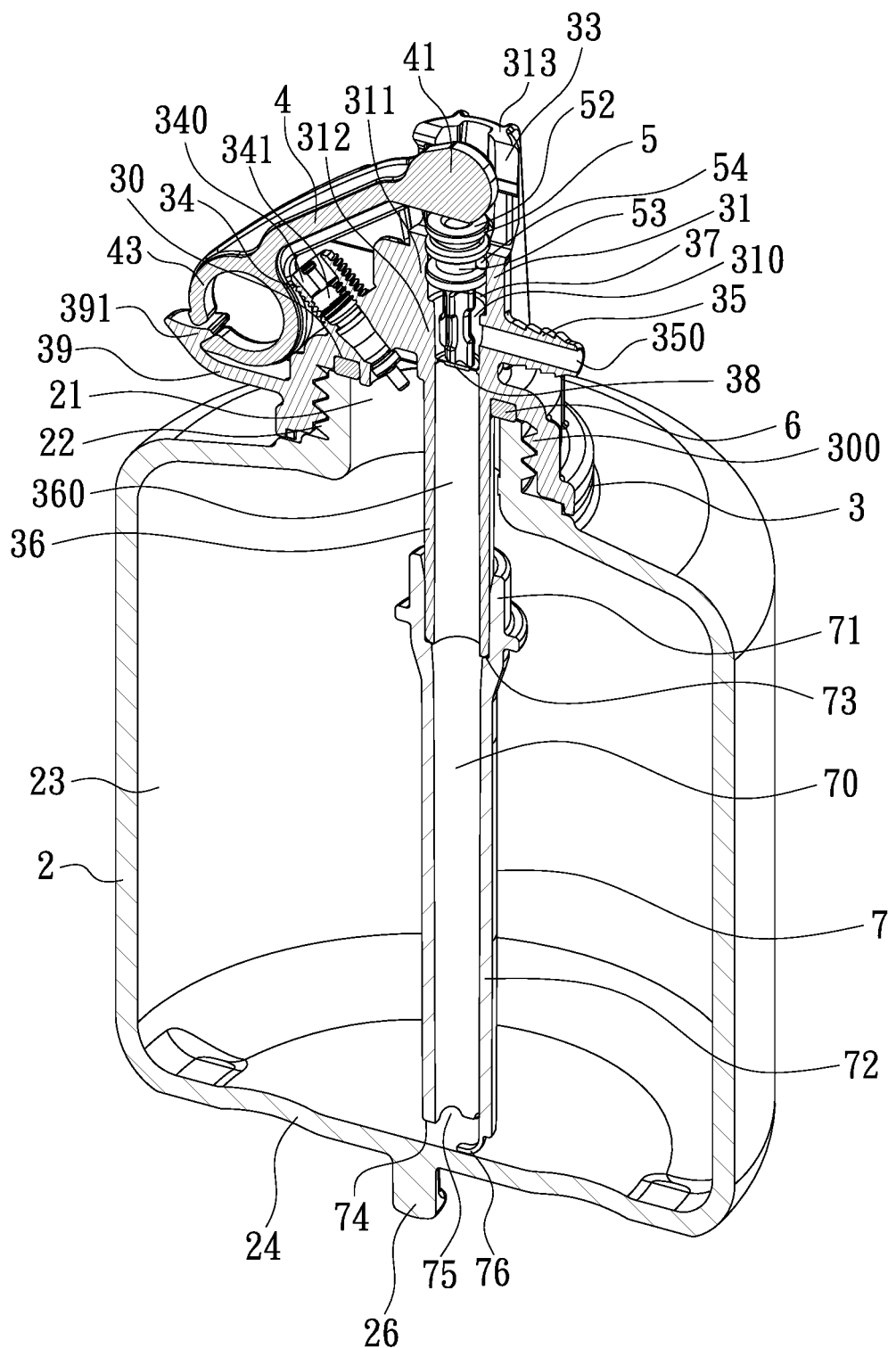
FIG. 8 is a cross-sectional perspective view showing the assembly of a part of the sealant dispenser according to the preferred embodiment of the present invention.
Figure 13:
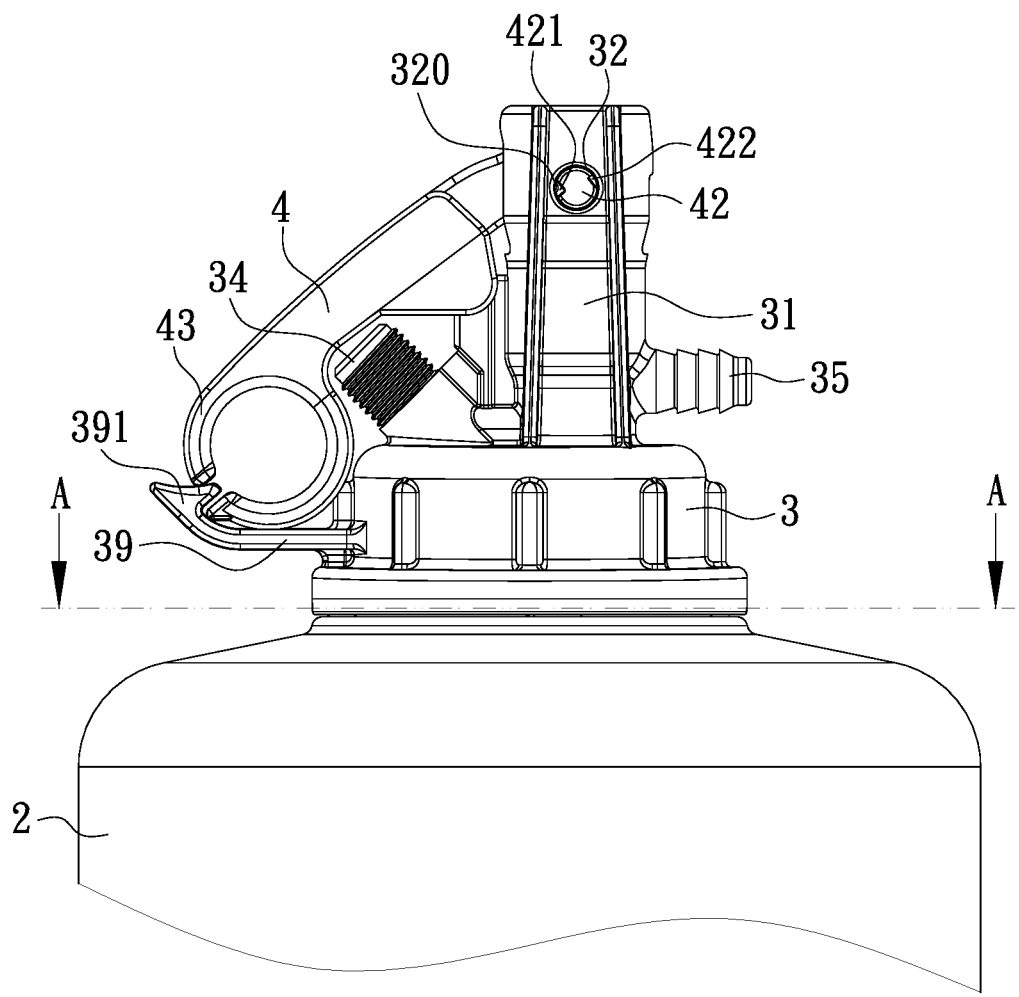
FIG. 13 is a side sectional view showing the assembly of a part of the sealant dispenser according to the preferred embodiment of the present invention.
Figure 14:
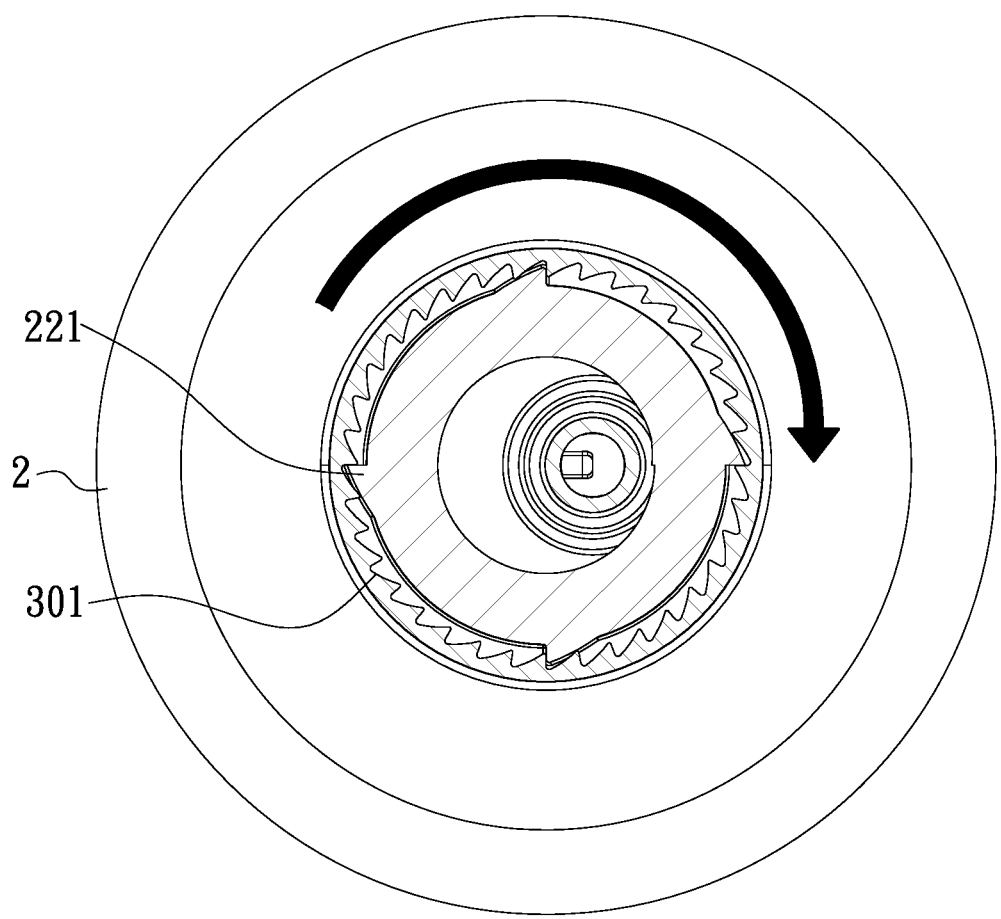
FIG. 14 is a cross sectional view taken along the line of A-A of FIG. 13.

As shown in FIGS. 7 and 8, the cap 3 includes female threads 300 formed around an inner wall thereof, multiple recesses 301 corresponding to the multiple ratchets 301 respectively, and a receiving groove 30 defined in a top of the cap 3 and configured to receive a washer 6, such that the multiple female threads 300 of the cap 3 are screwed with the multiple male threads 22 of the opening 21 of the hollow can 2 individually, thus connecting the cap 3 with the hollow can 2. When the cap 3 is connected with the hollow can 2, the washer 6 seals the opening 21 of the hollow can 2 tightly and securely, and the cap 3 is rotated so that the multiple ratchets 301 of the cap 3 are retained with the multiple ratchets 221 of the hollow can 2, thus avoiding a removal of the cap 3 and a leakage of the chemical sealant 25, as illustrated in FIG. 14. With reference to FIG. 13, the cap 3 includes a flexible flap 39 extending from an outer wall thereof, and the flexible flap 39 has a hook 391 arranged on a distal end thereof. The cap 3 includes a first tube 31 extending from the top thereof and a second tube 36 extending from a bottom of the cap 3 and communicating with the first tube 31, wherein the first tube 31 has a first channel 310 defined therein, a first extending section 311, a second extending section 312, two opposite sheets 313 arranged on an open end of the first extending section 311, two orifices 32 defined on the two opposite sheets 313 individually, two tabs 320 formed in the two orifices 32 respectively, a slot 33 formed between the two opposite sheets 313, a first branching extension 34 and a second branching extension 35 which both extend from the first tube 31, wherein the first branching extension 34 has an air conduit 340 defined therein and an air core element 341 received in the air conduit 340 and communicating with the accommodation chamber 23 of the hollow can 2, wherein an inner diameter of the first extending section 311 of the first tube 31 is more than the second extending section 312 of the first tube 31, and a first stepped portion 37 is defined between the first extending section 311 and the second extending section 312. The second branching extension 35 has a feeding conduit 350 defined therein and communicating with the first channel 310 of the first tube 31. The second tube 36 has a second channel 360 defined therein, a film 38 received in the second channel 360 configured to stop the first channel 310 of the first tube 31 and the second channel 360 of the second tube 36.

The sealant dispenser further comprises a punch element 5, and the punch element 5 includes a column 51 extending from a first end thereof, a head 52 arranged on a second end of the punch element 5, a notch 53 defined on the head 52 and configured to fit with an O ring 54, multiple spaced indentations 55 formed on the column 51, and multiple locking ribs 56 spaced from the multiple spaced indentations 55 individually, multiple cutouts 57 formed on the multiple locking ribs 56 respectively, and a tilted portion 58 arranged on a distal end of the column 51 below the multiple locking ribs 56 and the multiple spaced indentations 55. The punch element 5 is accommodated in the first channel 310 from a mouth of the first tube 31 of the cap 3 and is located above the film 38.

The sealant dispenser further comprises a cylinder 7, and the cylinder 7 includes a flowing room 70 defined therein, a first segment 71 formed on the cylinder 7, and a second segment 72, wherein an inner diameter of the first segment 71 is more than the second segment 72. The cylinder 7 further includes a second stepped portion 73 defined between the first segment 71 and the second segment 72, multiple slits 75 arranged on a lower portion 74 of the cylinder 7, and a wing 76 extending from the lower portion 74 below the multiple slits 75. The cylinder 7 is fitted with the second tube 36 of the cap 3 by ways of the first segment 71, and the second tube 36 is biased against the stepped portion 73 of the flowing room 70.

The sealant dispenser further comprises a drive element 4, and the drive element 4 includes an eccentric cam 41 fixed on a first end thereof, two opposite pegs 42 extending from two sides of the eccentric cam 41, two first dents 421 and two second dents 422 which are defined on the two opposite pegs 42 respectively, and a C-shaped grip portion 43 arranged on a second end of the drive element 4. The drive element 4 is rotatably connected with the two orifices 32 of the two opposite sheets 313 by using the two opposite pegs 42 individually, and the eccentric cam 41 of the drive element 4 is located on the mouth of the first tube 31 and abuts against the head 52 of the punch element 5, the C-shaped grip 43 swings along the two opposite pegs 42, wherein the drive element 4 swings along the slot 33 formed between the two opposite sheets 313 of the first tube 31.

The punch element 5, the cylinder 7, and the drive element 4 are connected on the cap 3. After the cap 3 is connected with the hollow can 2, the second tube 36 of the cap 3 and the cylinder 7 are received in the accommodation chamber 23 of the hollow can 2, as shown in FIG. 8.

As illustrated in FIG. 9, the C-shaped grip 43 of the drive element 4 is retained on the hook 391 of the flexible flap 39 to stop the first branching extension 34 of the cap 3 so as to indicate that the sealant dispenser is not opened, and one of the two first dents 421 of the two opposite pegs 42 is engaged with one of the two tabs 320 of the two orifices 32.

Figure 10:
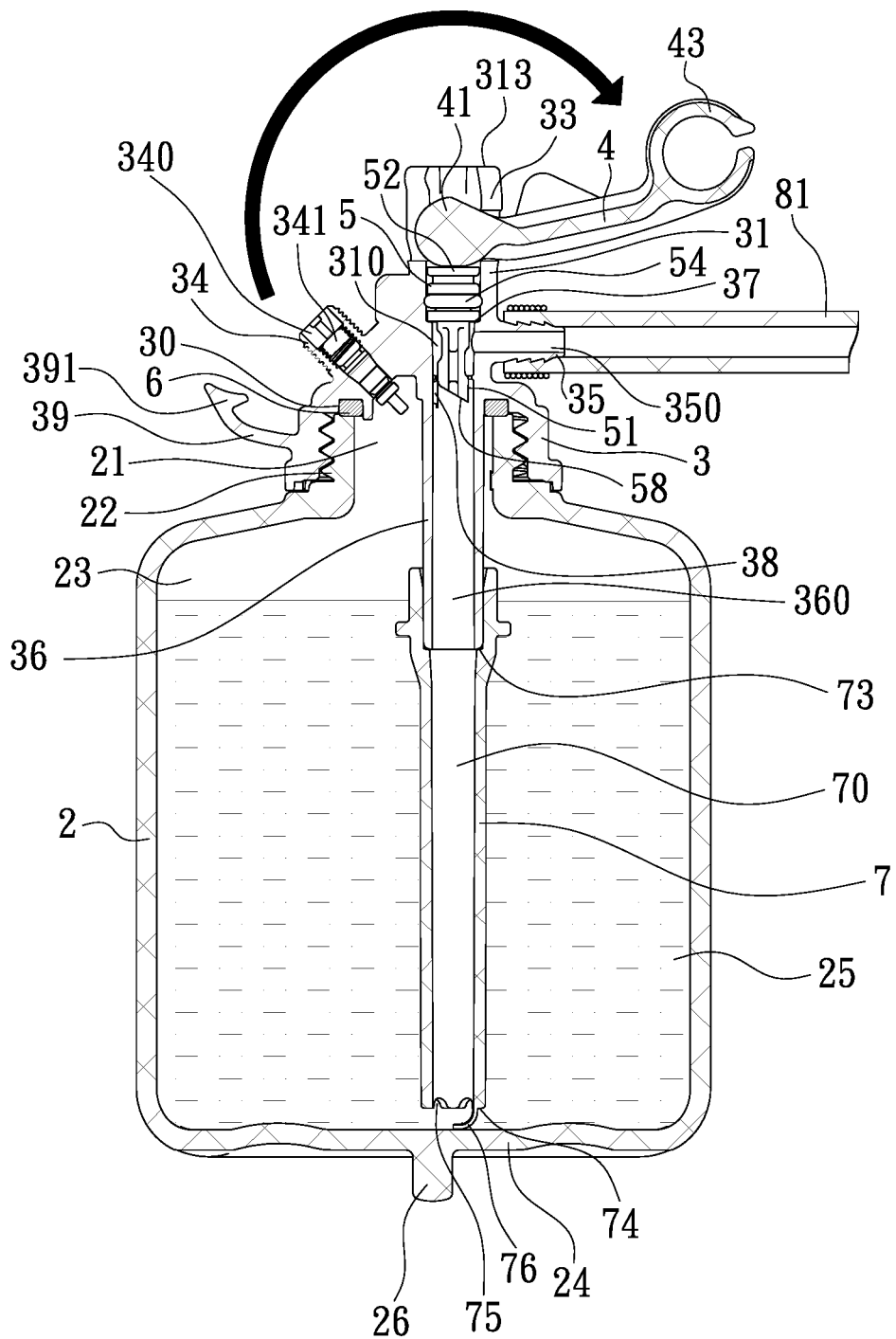
FIG. 10 is another cross sectional view showing the operation of the sealant dispenser according to the preferred embodiment of the present invention.

With reference to FIG. 9, in operation, a sealant supply hose 81 is connected with the second branching extension 35 and a nozzle of a broken tire (not shown). Referring further to FIG. 10, the drive element 4 is rotated so that the eccentric cam 41 movable abuts against the head 52 of the punch element 5 from a short distance 44 to a long distance 45, and the one first dent 421 of the two opposite pegs 42 is changed to one of the two second dents 422 so that the one second dent 422 is engaged with the one tab 320.

As shown in FIGS. 6 and 13, the punch element 5 is pushed downward to abut against the first stepped portion 37 so that the tilted portion 58 of the punch element 5 pierces the film 38, and the first channel 310 of the first tube 31 and the second channel 360 of the second tube 36 are in communication with the accommodation chamber 23 of the hollow can 2, wherein the film 38 does not remove from the second channel 360.

Figure 11:
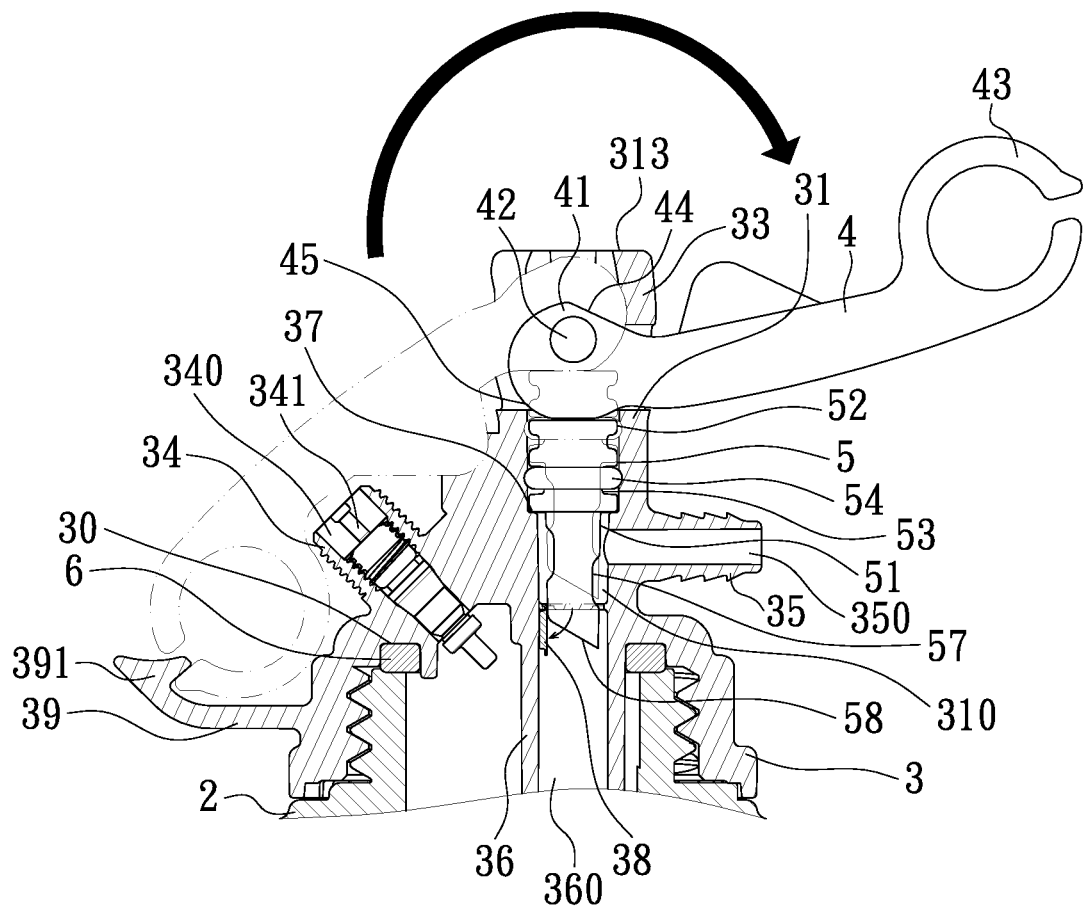
FIG. 11 is also another cross sectional view showing the operation of the sealant dispenser according to the preferred embodiment of the present invention.

As illustrated in FIG. 11, the O ring 54 seals a gap between the punch element 5 and the first channel 310 of the first tube 31 to avoid the leakage of the chemical sealant 25 from the mouth of the first tube 31.

Figure 2:
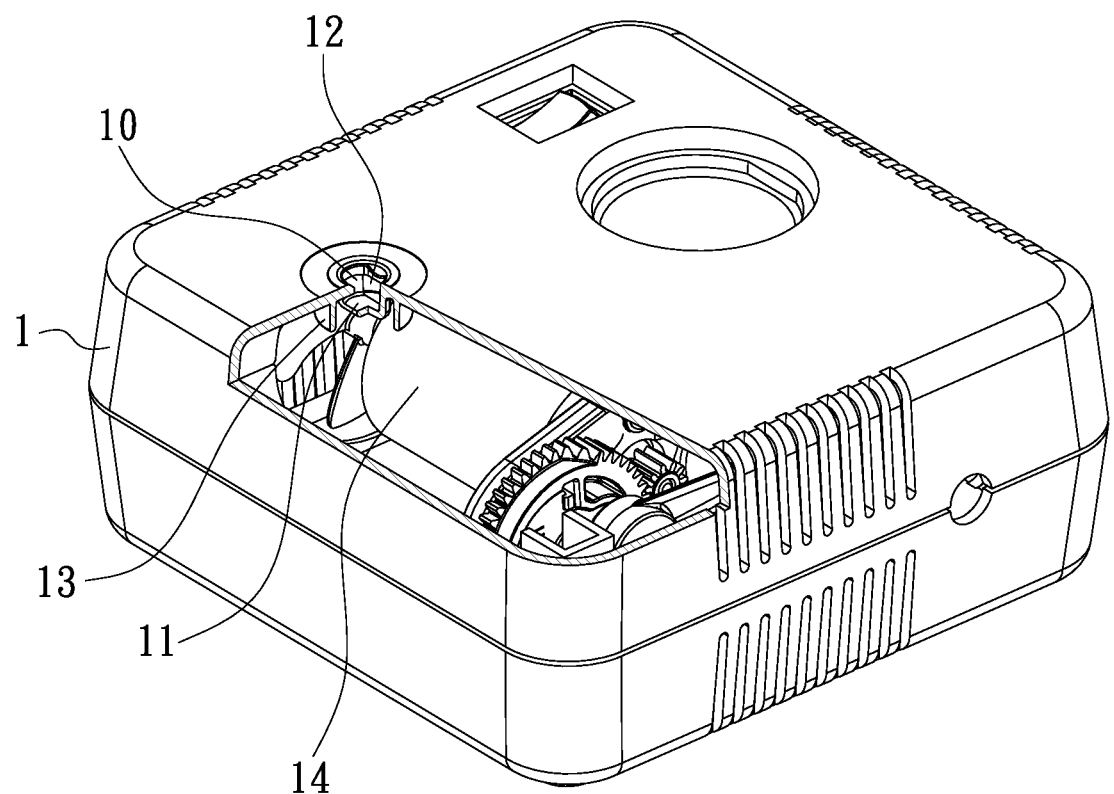
FIG. 2 is a perspective view showing the assembly of an accommodation box according to the preferred embodiment of the present invention.
Figure 3:
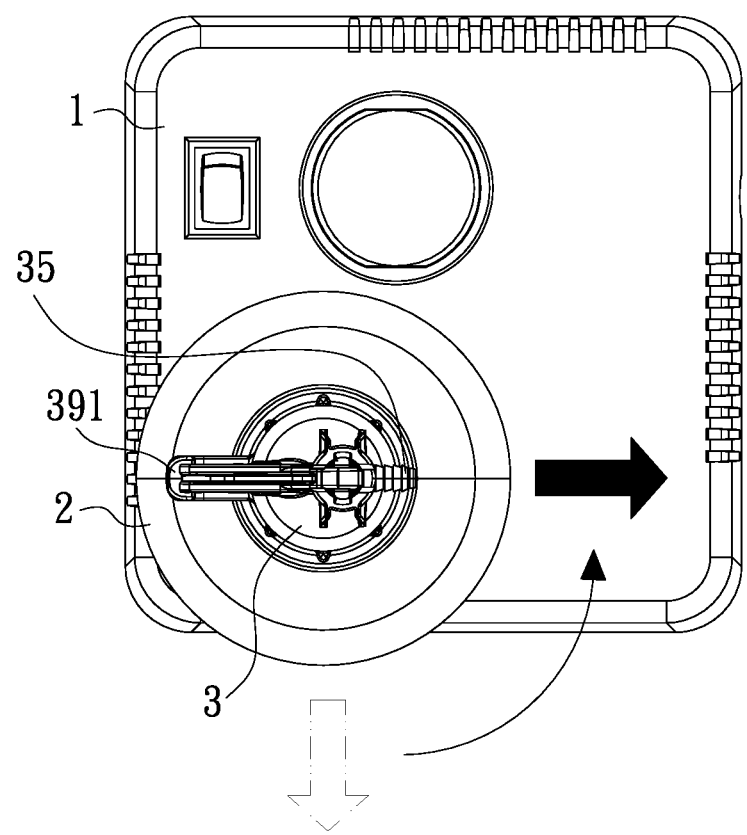
FIG. 3 is a side plan view showing the assembly of the sealant dispenser according to the preferred embodiment of the present invention.
Figure 4:
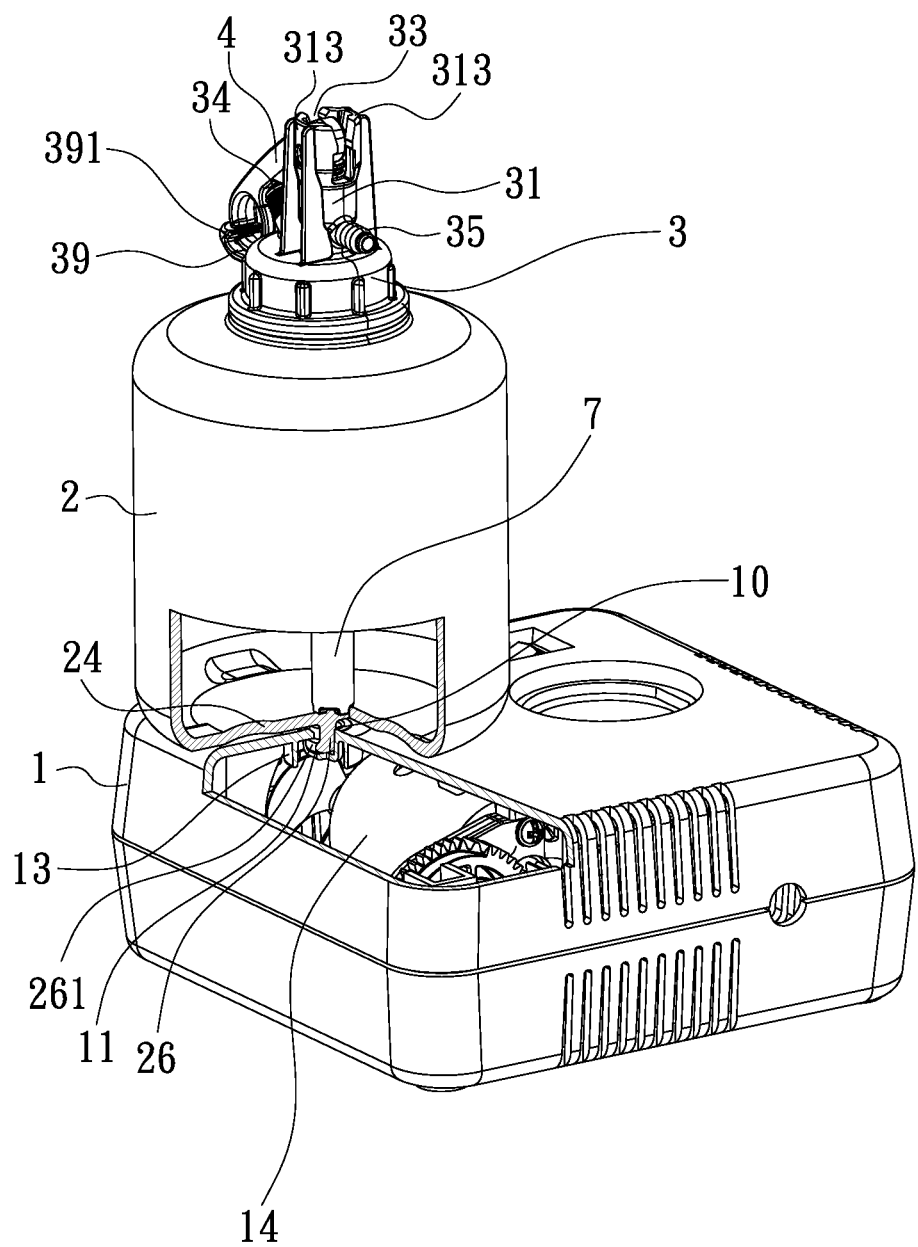
FIG. 4 is a cross-sectional perspective view showing the application of the sealant dispenser according to the preferred embodiment of the present invention.

Referring to FIG. 12, a gas supply hose 82 is connected with the air compressor 12 (as shown in FIGS. 1 and 2) and the first branching extension 34 so that the high-pressure gas is fed to force the chemical sealant 25 from the air core element 341 of the first branching extension 34, and the chemical sealant 25 flows into the nozzle of the broken tire via the multiple slits 75, the flowing room 70, the second channel 360, the multiple spaced indentations 55, the multiple cutouts 57, the first channel 310, the feeding conduit 350, and the sealant supply hose 81. Thereafter, the wing 76 abuts against the connection seat 24 of the hollow can 2 and forces the cylinder 7 to matingly contact with the second tube 36, and the stepped portion 73 of the flowing room 70 is biased against the second tube 36, thus feeding the chemical sealant and feeding high-pressure gas into the broken tire safely.

Figure 15:
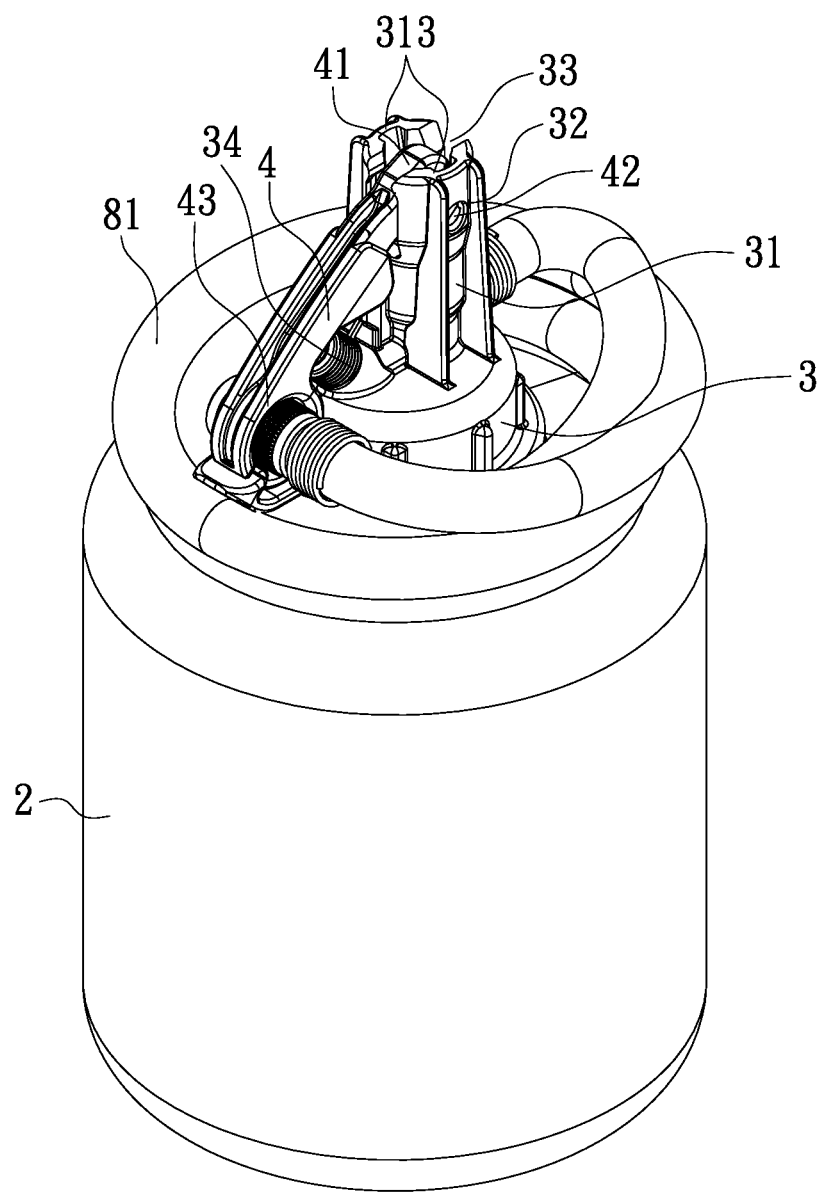
FIG. 15 is a perspective view showing the application of the sealant dispenser according to the preferred embodiment of the present invention.
Figure 16:
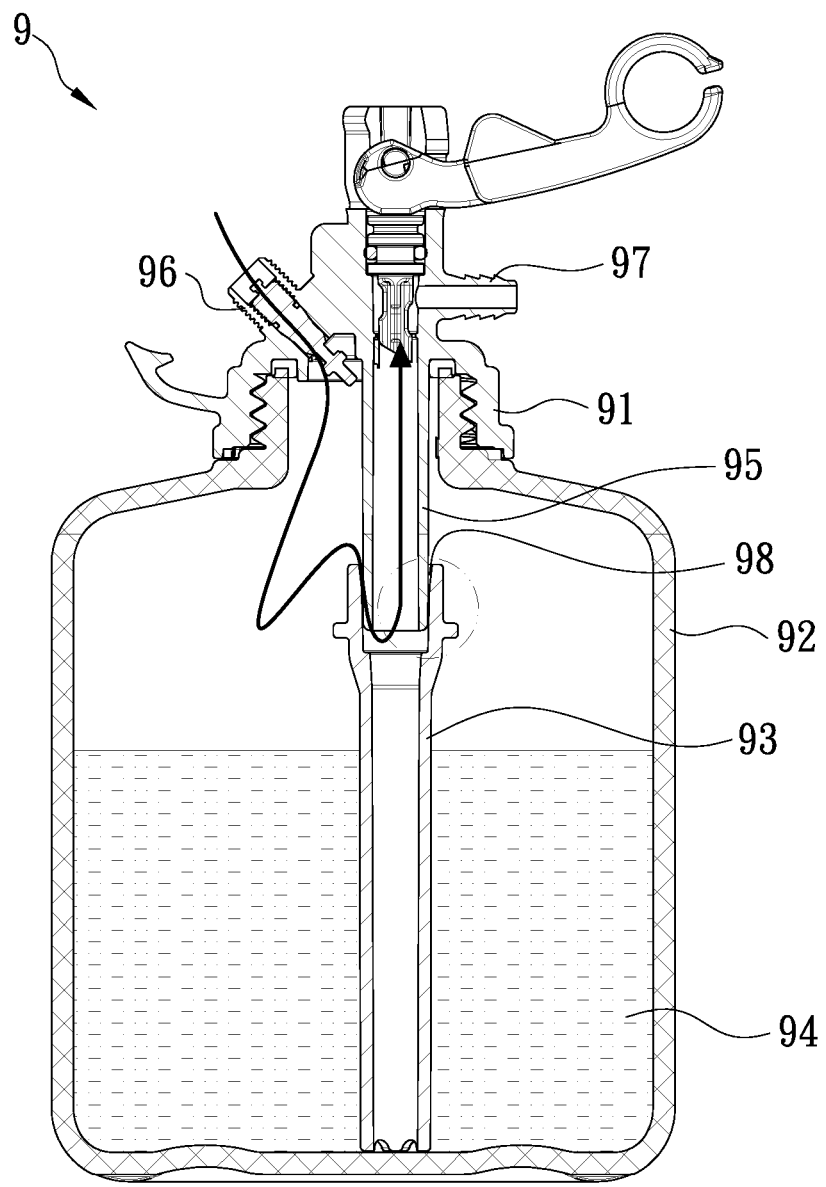
FIG. 16 is a cross sectional view of a conventional sealant dispenser.

With reference to FIG. 15, the C-shaped grip 43 of the drive element 4 is retained on the hook 391 of the flexible flap 39 to stop the first branching extension 34 of the cap 3, a first end of the sealant supply hose 81 is connected with the second branching extension 35, and a second end of the sealant supply hose 81 is wound around the cap 3 and is connected with the C-shaped grip 43.

Thereby, the sealant dispenser is fixed on the accommodation box 1 in which the air compressor 14 is accommodated, wherein the accommodation box 1 includes a fixing hole 10, the U-shaped protrusion 11 formed on the lower end of the fixing hole 10, the positioning space 12 defined on the fixing hole 10 above the U-shaped protrusion 11, and the peripheral column 13 surrounding around the fixing hole 10. The hollow can 2 includes the connection seat 24 and the insertion 26 extending from the connection seat 24 and inserted into the fixing hole 10 of the accommodation box 1, and the sealant dispenser is rotated so that the two peripheral ribs 261 of the bottom of the insertion 26 are retained with the positioning space 12 of the fixing hole 10, thus fixing the sealant dispenser on the accommodation box 1 securely.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

I claim:

1. A sealant dispenser comprising:
a hollow can including an accommodation chamber defined in the hollow can, an opening defined on a first end of the hollow can, a connection seat arranged on a second end of the hollow can, chemical sealant accommodated in the accommodation chamber, an insert extending from the connection seat, and at least two peripheral ribs formed on a bottom of the insert;
wherein the sealant dispenser is fixable on an accommodation box in which an air compressor is accommodated, the accommodation box including a fixing hole, a U-shaped protrusion formed on a lower end of the fixing hole, a positioning space defined on the fixing hole above the U-shaped protrusion, and a peripheral column surrounding the fixing hole, the U-shaped protrusion and the positioning space, wherein the hollow can is insertable into the fixing hole of the accommodation box, and the sealant dispenser is rotatable so that the two peripheral ribs of the bottom of the insert are retained with the positioning space of the fixing hole, thus fixing the sealant dispenser on the accommodation box;
the sealant dispenser further comprising:
a cap connected with the opening of the hollow can, wherein the cap includes a first tube extending from a top thereof and a second tube extending from a bottom of the cap and communicating with the first tube, wherein the first tube has a first channel defined therein, the second tube has a second channel defined therein, a film received in the second channel configured to stop the first channel of the first tube and the second channel of the second tube;
a punch element accommodated in the first channel from a mouth of the first tube of the cap and located above the film; and
a drive element rotatable along the cap to force the punch element downward to pierces the film, and an air conduit of the cap in communication with a feeding conduit of the cap causes pressurized gas to be fed into the hollow can from the air compressor via the air conduit, and the chemical fluid is forced by the pressurized gas to flow out of the feeding conduit.

2. The sealant dispenser as claimed in claim 1, wherein the hollow can includes male threads formed around the opening of the hollow can, multiple ratchets defined between the opening and the hollow can, and a receiving groove is defined in a top of the cap and configured to receive a washer, such that multiple female threads of the cap engage with the multiple male threads of the opening of the hollow can.

3. The sealant dispenser as claimed in claim 2, wherein the first tube has a first extending section, and a second extending section, two opposing sheets arranged on an open end of the first extending section, two orifices defined on the two opposing sheets respectively, two tabs formed in the two orifices respectively, a slot formed between the two opposing sheets, a first branching extension and a second branching extension both extending from the first tube, wherein the first branching extension has an air conduit defined therein and an air core element received in the air conduit and communicating with the accommodation chamber of the hollow can, an inner diameter of the first extending section of the first tube being greater than an inner diameter of the second extending section of the first tube, and a first stepped portion is defined between the first extending section and the second extending section, the second branching extension having the feeding conduit defined therein and communicating with the first channel of the first tube, wherein the cap further includes a flexible flap extending from an outer wall thereof, and the flexible flap has a hook arranged on a distal end thereof.

4. The sealant dispenser as claimed in claim 3, wherein the punch element includes a column extending from a first end thereof, a head arranged on a second end of the punch element, a notch defined on the head and accepting an O ring, multiple spaced indentations formed on the column, and multiple locking ribs spaced from the multiple spaced indentations respectively, multiple cutouts formed on the multiple locking ribs respectively, and a tilted portion arranged on a distal end of the column below the multiple locking ribs and the multiple spaced indentations, wherein the punch element is accommodated in the first channel from the mouth of the first tube of the cap and is located above the film.

5. The sealant dispenser as claimed in claim 4, wherein the drive element includes an eccentric cam fixed on a first end thereof, two opposite pegs extending from two sides of the eccentric cam, two first dents and two second dents defined on the two opposite pegs respectively, and a C-shaped grip portion is arranged on a second end of the drive element, wherein the drive element is rotatably connected with the two orifices of the two opposing sheets by using the two opposite pegs respectively, and the eccentric cam of the drive element is located on the mouth of the first tube and abuts the head of the punch element, the C-shaped grip swingable along the two opposite pegs, wherein the drive element is swingable along the slot formed between the two opposing sheets of the first tube.

6. The sealant dispenser as claimed in claim 5, wherein the C-shaped grip of the drive element is retained on the hook of the flexible flap to stop the first branching extension of the cap so as to indicate that the sealant dispenser is not opened.

7. The sealant dispenser as claimed in claim 5, wherein a first end of a sealant supply hose is connected with the second branching extension, and a second end of the sealant supply hose is wound around the cap and is connected with the C-shaped grip.

8. The sealant dispenser as claimed in claim 1, wherein a cylinder includes a second stepped portion defined between a first segment and a second segment, multiple slits arranged on a lower portion of the cylinder, a wing extending from the lower portion below the multiple slits, and the cylinder is fitted with the second tube of the cap by way of the first segment, and the second tube is biased against the second stepped portion.

* * * * *